United States Patent
Skarlupka

(10) Patent No.: US 9,010,521 B2
(45) Date of Patent: Apr. 21, 2015

(54) COUNTERBALANCED ELEVATING CONVEYOR

(71) Applicant: Donald Bruce Skarlupka, Deerbrook, WI (US)

(72) Inventor: Donald Bruce Skarlupka, Deerbrook, WI (US)

(73) Assignee: Skarlupka Mfg., Inc., White Lake, WI (US)

( * ) Notice: Subject to any disclaimer, the term of this patent is extended or adjusted under 35 U.S.C. 154(b) by 180 days.

(21) Appl. No.: 13/875,519

(22) Filed: May 2, 2013

(65) Prior Publication Data

US 2014/0326581 A1 Nov. 6, 2014

(51) Int. Cl.
*B65G 41/00* (2006.01)
*B65G 47/56* (2006.01)
*B65G 21/12* (2006.01)

(52) U.S. Cl.
CPC ..................................... *B65G 21/12* (2013.01)

(58) Field of Classification Search
None
See application file for complete search history.

(56) References Cited

U.S. PATENT DOCUMENTS

| | | | |
|---|---|---|---|
| 4,004,696 A | 1/1977 | Briggs | |
| 4,664,271 A | 5/1987 | Evans | |
| 4,924,993 A | 5/1990 | Buxton | |
| 5,090,550 A * | 2/1992 | Axmann | 198/313 |
| 5,788,461 A * | 8/1998 | Easton et al. | 414/796.2 |
| 5,909,796 A * | 6/1999 | Soldavini | 198/369.2 |
| 6,006,893 A | 12/1999 | Gilmore et al. | |
| 6,929,113 B1 | 8/2005 | Hoover et al. | |
| 7,472,785 B2 | 1/2009 | Albright et al. | |
| 2008/0264886 A1 | 10/2008 | Adamiec et al. | |
| 2012/0097498 A1 | 4/2012 | Campbell et al. | |
| 2012/0160636 A1 | 6/2012 | Windfeld et al. | |

OTHER PUBLICATIONS www.dornerconveyors.com/Capabilities/Line-Access.aspx dated Mar. 6, 2013.
www.avsdanmarkdk/web/bandtransportorer/industri dated Mar. 8, 2013.

* cited by examiner

*Primary Examiner* — Kavel Singh
(74) *Attorney, Agent, or Firm* — Stiennon & Stiennon

(57) ABSTRACT

An elevating conveyor is mounted to a pivoting bridge so that the elevating conveyor can be shifted by a 22 degree rotation between a lowered position in engagement with a loading floor and an elevated storage position where the conveyor is out of the way of the loading floor. A counterweight arrangement is mounted to the bridge to bias the conveyor toward the loading floor when it is in a lowered position, and to bias it toward the elevated storage position when it is in the up position. The conveyor may be readily moved between the positions with a moderate application of force. The force may be applied by an operator standing on the loading floor or by a liner actuator mounted between the bridge and a fixed structure.

20 Claims, 5 Drawing Sheets

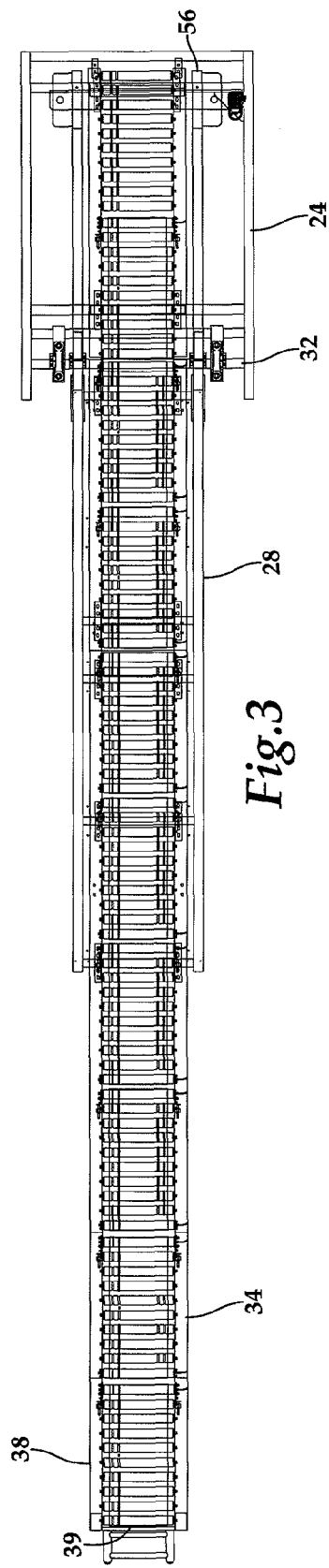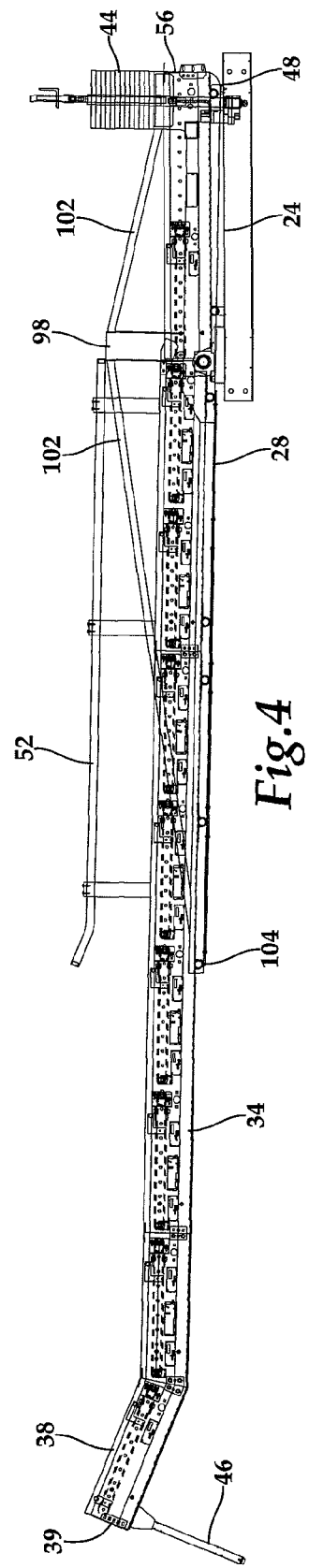

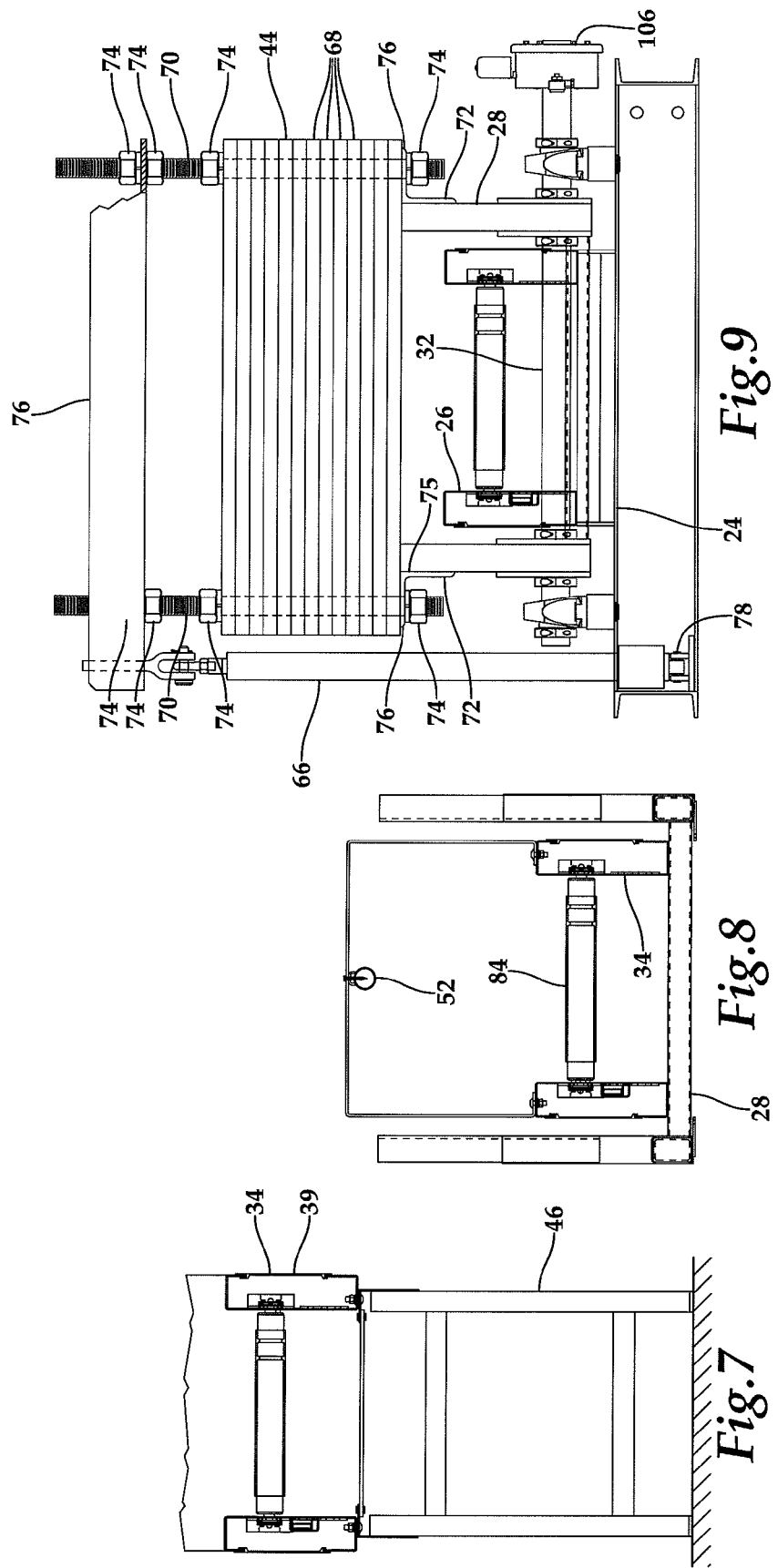

COUNTERBALANCED ELEVATING CONVEYOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conveyors in general and to in particular to elevating conveyors which can be retracted for storage.

Conveyor systems have been developed for both speedy and efficient loading or unloading of packages or containers from or to transportation vehicles or storage areas. The packages and or containers are typically not sorted or only partially sorted when they arrive and are loaded unloaded in the most convenient sequence, normally starting with those most accessible, and fed onto an elevating conveyor which delivers the packages or containers to a sorting conveyor above the working floor which distributes individual packages or containers to workstations on the working floor below, where the packages or the containers' contents may be further sorted. Because delivery of packages is not generally continuous, the elevating conveyor is typically pivoted to a horizontal elevated position, for safety and convenience reasons, to remove the elevating conveyor from the ground or working floor space when it is not in use. In existing systems a chain fall, wire drum winch, or, pneumatic cylinder is used to elevate the lower loading side of the elevating conveyor. The chain fall or other hoist rotates the elevating conveyor about a pivot mounted at the discharge end where the elevating conveyor discharges to the elevated sorting conveyor. The chain fall or hoist represents an additional cost an inconvenience and a possible obstacle to workers.

SUMMARY OF THE INVENTION

The elevating conveyor of this invention is mounted to a bridge which is counterweighted and turns about an overhead pivot shaft. The bridge supports the elevating conveyor so both the bridge and the elevating conveyor pivot about the same overhead pivot shaft. The bridge extends in part above and beyond the pivot shaft and terminates in a bracket for mounting a counterweight. The elevating conveyor is mounted to a part of the bridge which extends below the pivot and is arranged to pivot 22° about the pivot shaft between a loading position resting on the work floor and an elevated storage position where the conveyor and bridge are approximately parallel to the work floor. The bridge counterweight is spaced away from the pivot by the part of the bridge extending beyond the pivot shaft and is mounted on the counterweight bracket spaced upwardly of a plane containing the elevating conveyor. The counterweight thus arranged has a center of gravity which moves toward the pivot point more than the center of gravity of the counterbalanced weight on the opposite side of the pivot. This movement is selected so the total center of gravity of the bridge and elevating conveyor when in the down position produce a downward force on the floor amounting to about 30 pounds, whereas in the up position a comparable force amounting to about 30 pounds holds the conveyor in an up or storage position. The elevating conveyor has a leg at its lower end which holds the conveyor at an ergonomic height above the work floor e.g., 2 feet 8½ inches, for loading with boxes or cartons.

The bridge and the elevating conveyor are arranged so it can be raised with 30 pounds lifting force, or lowered by reaching up and pulling the conveyor down with a 30 pound force. The bridge may be moved by a linear actuator, for example an electromechanical type actuator. A spring activated brake is failsafe, requiring electrical power to release the brake so that the bridge and elevating conveyor are positively prevented from movement when power fails or is off.

It is an object of the present invention to provide an elevating conveyor which is simpler and more easily operated and which provides safety benefits.

It is a further object of the present invention to provide a pivoting bridge which supports an elevating conveyor which is mechanically arranged to be stable in the up or down position.

Further objects, features and advantages of the invention will be apparent from the following detailed description when taken in conjunction with the accompanying drawings.

BRIEF DESCRIPTION OF THE DRAWINGS

FIG. 3 is a top plan view of the elevating conveyor of FIG. 1.

FIG. 4 is a side elevational view of the elevating conveyor on the counterweighted support bridge of FIG. 1 in the up position.

FIG. 7 is a fragmentary front elevational view of the apparatus of FIG. 1.

FIG. 8 is a fragmentary cross-sectional side of the device of FIG. 1, taken along section line 8-8 and showing a pin lock on the pivot shaft.

FIG. 9 is a fragmentary rear elevational view of the device of FIG. 1.

DESCRIPTION OF THE PREFERRED EMBODIMENTS

Figure 1:
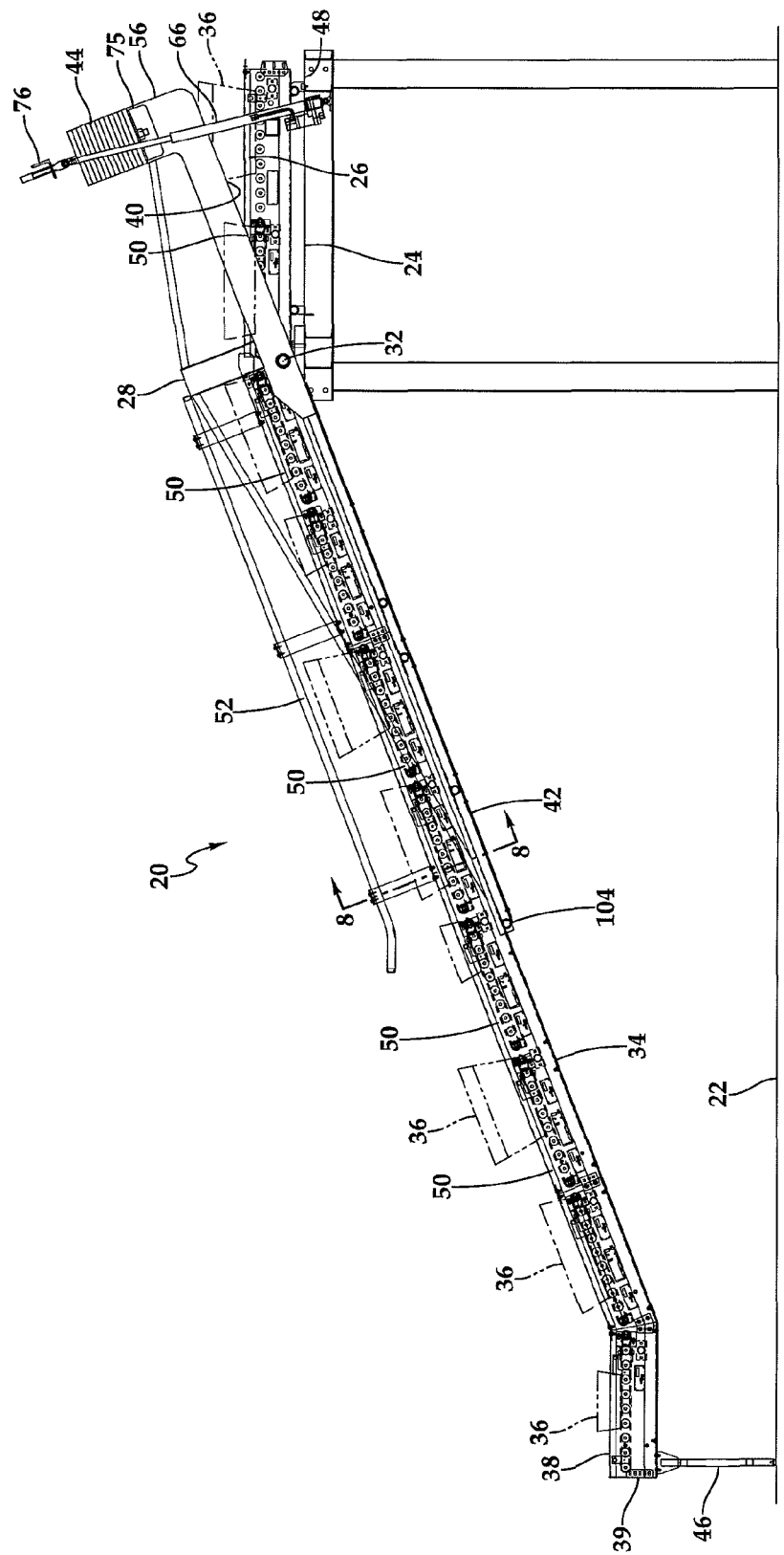
FIG. 1 is a side elevational view of a elevating conveyor on a counterweighted support bridge of this invention.

Referring more particularly to FIGS. 1-9 wherein like numbers refer to similar parts, a conveyor system 20 is shown in FIG. 1. The conveyor system 20 is mounted to extend between a loading floor 22 and an upper platform or distribution level 24. The conveyor system 20 comprises a bridge structure 28 and an elevating conveyor mounted to the bridge structure. The bridge structure is itself mounted to a pivot shaft 32 on the upper platform 24 so the bridge can pivot about a horizontal axis to pass through a vertical plane 30 which extends through the pivot shaft. The elevating conveyor 34 is arranged to transport packages or cartons 36 from a loading section 38 at a lower end 39 of the elevating conveyor to an elevated conveyor 26. The bridge 28 supports the elevating conveyor 34 when the bridge and the elevating conveyor are in the down position as illustrated in FIG. 1. The bridge 28 has a first portion 42 which supports a counterweight 44 and a second portion 40 which supports the elevating conveyor 34 and which is opposite the first portion with respect to the pivot, bearing or shaft 32. The loading section 38 at the lower end 39 of the elevating conveyor 34 is supported by a leg 46 on the loading floor 22.

The bridge 28 moves between the lowered position shown in FIG. 1 to an elevated position shown in FIG. 4 where the bridge rests on a stop 48. The elevating conveyor 34 may be any type of conveyor e.g., rolls or belts, but is shown in FIG. 1 as a series of belt conveyors 50 arranged with conventional sensors and controls to detect the presence of packages, cartons, or trays 36, and control the plurality of belt conveyors 50. The elevating conveyor 34 supports a guide bar 52, shown in FIG. 8, to prevent cartons 36 from tipping and falling off the elevating conveyor 34.

Figure 2:
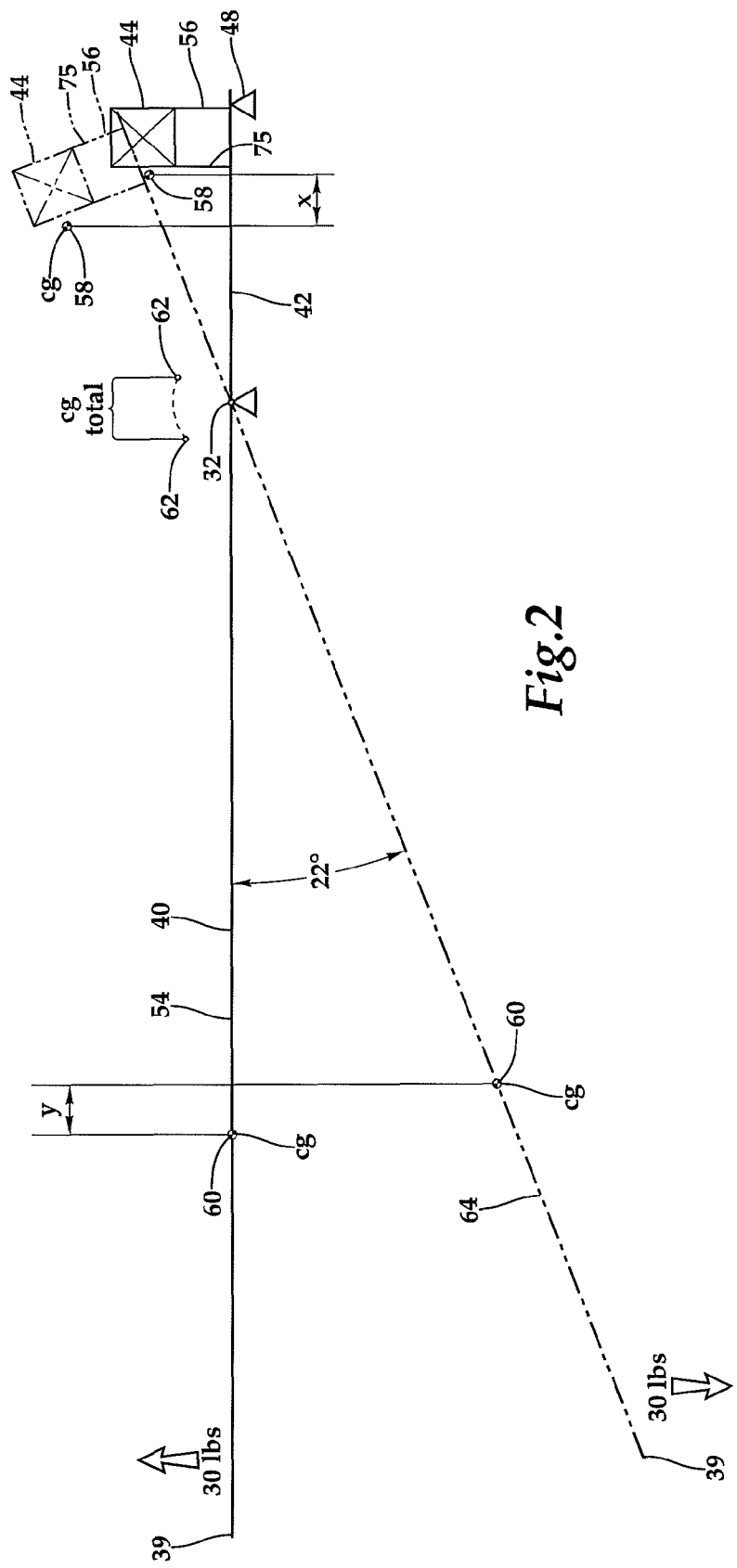
FIG. 2 is a side elevational schematic view showing the operation and mass properties of the elevating conveyor on the counterweighted support bridge of FIG. 1.

The schematic view of FIG. 2 represents the bridge 28 and the elevating conveyor 34 in the up position as a horizontal straight line 54 with a counterweight 44 positioned on an upper end 56 of the bridge. The counterweight 44 is elevated above the upper end 56 of the bridge, as illustrated schematically in FIG. 2 and as illustrated in detail in FIGS. 5, 6 and 9. As shown in FIG. 2, the center of gravity (cg) 58 of the first portion 42 is positioned above the line representing the bridge 28 and elevating conveyor 34, whereas the center of gravity (cg) 60 of the second portion 40 of the bridge and the elevating conveyor are positioned on the line 54. Referring to the straight line 54 of FIG. 2 representing the bridge 28 and the elevating conveyor 34, a total center of gravity (total cg) 62 of the combination bridge and elevating conveyor is positioned over the first portion of the bridge 42, to the right as shown in FIG. 2, of the pivot shaft 32 and therefore biases the bridge and elevating conveyor in the up position as shown in FIG. 4, and schematically as the horizontal line 54 of FIG. 2. When the conveyor is in the down position as illustrated by the sloping line 64 in FIG. 2, the (cg) 58 of the first portion 42 of the bridge 28, and the (cg) 60 of the second portion 40 of the bridge and the elevating conveyor, both move toward the pivot 32. However because the counterweight 44 is elevated above the horizontal line 54 the cg of the first portion 42 moves a greater distance toward the pivot 32 than the cg of the second portion 40 moves toward the pivot so that the total cg 62 of the bridge 28 and elevating conveyor 34 moves to the left in FIG. 2 to be on the downward side of the pivot 32, thus biasing the bridge and elevating conveyor in the down position represented by the line 64 in FIG. 2. In the down position, as shown in FIG. 1, the support leg 46 extends from the lower end of the bridge and conveyor to engage the loading floor 22.

The result of the position of the counterweight 44 in an elevated position on the upper end 56 of the bridge 28 is to create a mechanical arrangement wherein the bridge and elevating conveyor 34 has two stable positions: a down position, as shown in FIG. 1, where the elevating conveyor leg 46 is biased against the loading floor 22; and an up position, shown in FIG. 4, where the bridge first portion 42, on the opposite side of the pivot, is biased against the stop 48. The bridge 28 and elevating conveyor 34 can be stably positioned either raised or lowered with very little force, for example by simply pulling the elevating conveyor 34 down by means of the conveyor leg 46, until the total cg 62 is on the lower side of the pivot 32, or by lifting the elevating conveyor 34 up until the total cg 62 passes to the upper side of the pivot 32 and the bridge 28 and the elevating conveyor 34 pivot to the up position shown in FIG. 4. Typically the size and positioning of the counterweight 44 are selected so that a gravitational biasing force of approximately 20-80 pounds is created to hold the bridge 28 and elevating conveyor 34 in both the up and down positions.

Figure 5:
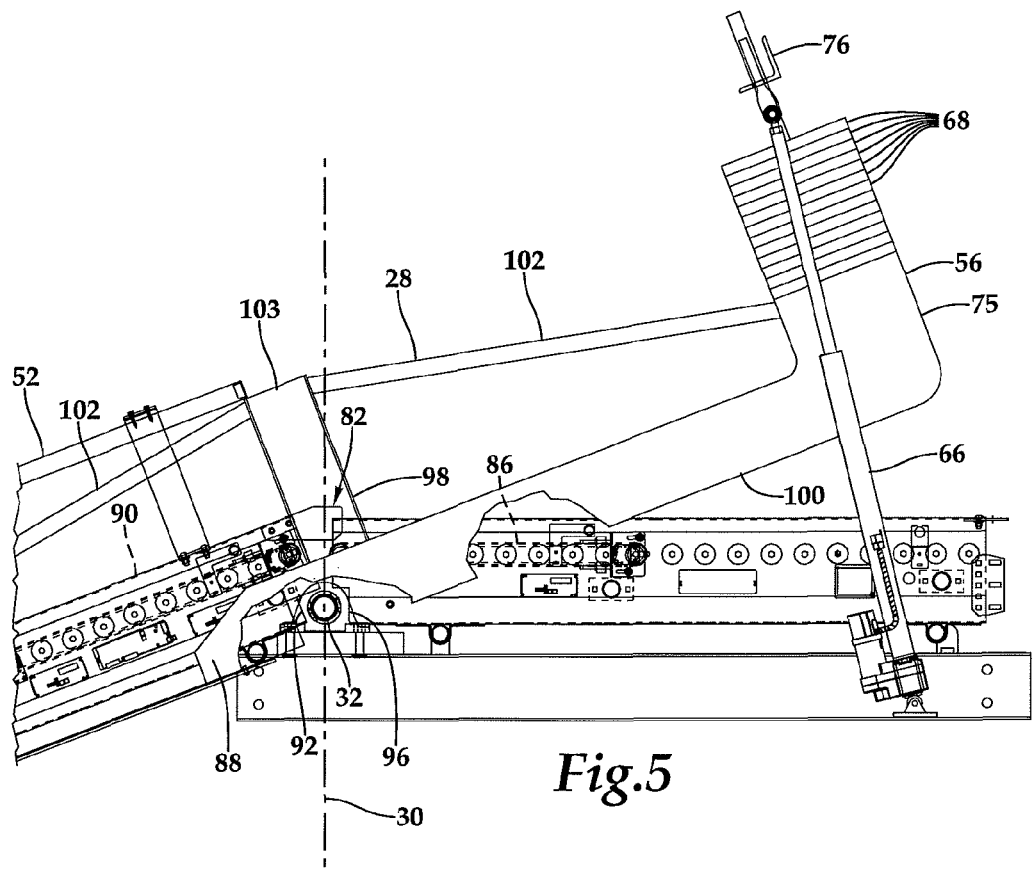
FIG. 5 is a fragmentary side elevational view showing an electromechanical actuator for controlling the movement of the counterweighted support bridge of FIG. 1, showing the conveyor in the down position.
Figure 6:
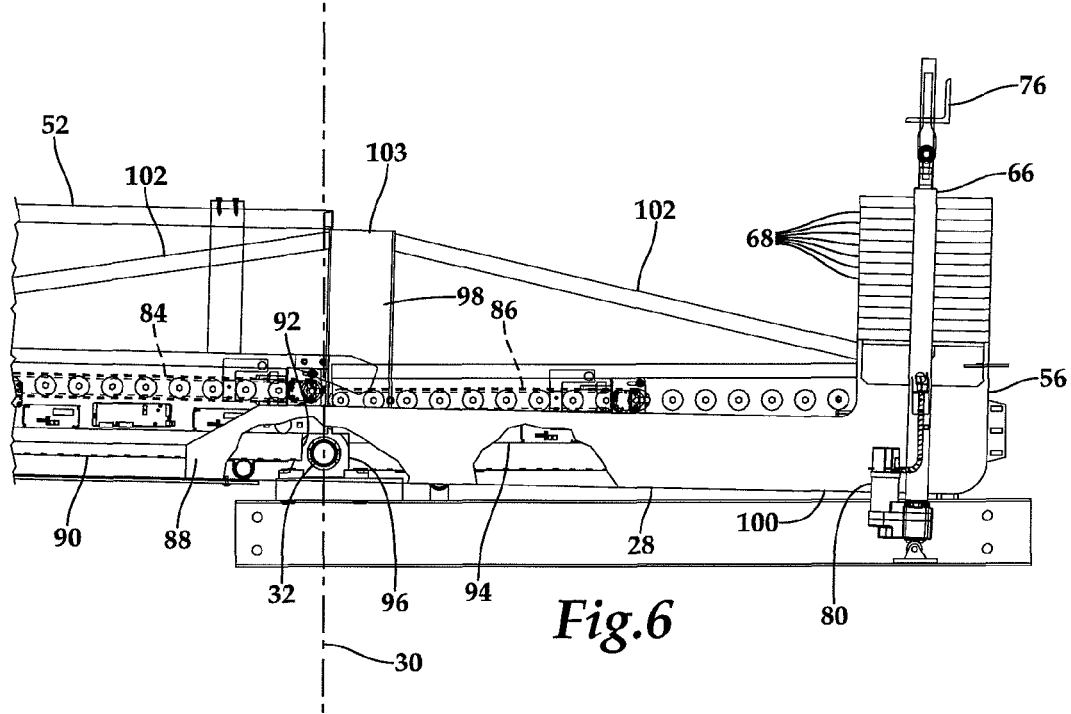
FIG. 6 is a fragmentary side elevational view of the apparatus of FIG. 5, showing the support bridge in the up position.

As shown in FIGS. 5, 6, and 9 the movement of the bridge 28 can also be controlled by a linear actuator 66, shown as an electromechanical actuator, to overcome the small gravitational biasing force to move the bridge 28 and elevating conveyor 34 between the up and down positions. As best shown in FIG. 9, the counterweight 44 is comprised of a plurality of individual weights 68 which are mounted over threaded support rods 70 which connect with outboard flanges 72 welded or mounted to the upper end 56 of the bridge 28. Holes in the flanges 72 receive the threaded support rods 70 which pass through holes in the individual weights 68. Nuts 74 are threadedly engaged with the rods 70 to clamp the individual weights 68 to the flanges 72 of the counterweight brackets 75 to form the counterweight 44. Additional nuts 74 are positioned above the counterweight 44 on the threaded supports 70 and engage an attachment flange 76. This arrangement of the threaded supports 70 and the nuts 74 allows the counterweight 44 to be adjusted for changes in the weight of the elevating conveyor 34. The linear actuator 66 is pivotally mounted to the attachment flange 76 and pivotally mounted to the upper platform 24 so that the actuator 66 may rotate with respect to both the attachment flange and a mounting point 78 on the upper platform. An electric motor 80, as shown in FIG. 6, drives the linear actuator 66 to raise and lower the bridge 28 with a relatively small force of, for example, 30 pounds positive to 30 pounds negative force as the bridge 28 moves from a horizontal position (shown in FIG. 6) to a lowered functional position (shown in FIG. 5). In the lowered functional position the bridge is positioned with an approximately 22° negative slope with respect to the pivot 32, and the elevating conveyor 34 engages the loading floor 22 with the support leg 46.

In order to minimize a gap 82 which opens between the elevating conveyor 34 and the elevated conveyor 26, the conventional conveyor units which are used to construct both conveyors must be modified to allow for the conveying surface 84 of the elevating conveyor 34 to more closely approach the conveying surface 86 on the elevated conveyor 26. Specifically, the support structure 88 of the conveying unit 90 of the elevating conveyor 34 closest to the pivot 32 has a cutaway 92 as shown in FIGS. 5 and 6. The cutaway 92 allows the conveying surface 84 to overlie the pivot shaft forming the pivot 32, particularly in the elevated position shown in FIG. 6. Similarly the elevated conveyor 26 conveying unit 94 closest to the pivot 32 has a cutaway 96 in the support structure of the conveying unit. The cutaway 96 allows the conveying surface 86 to overlie the shaft forming the pivot 32. Thus when the bridge 28 and elevating conveyor 34 are in the elevated position, shown in FIG. 6, the conveying surface 84 abuts or closely abuts the conveying surface 86 of the elevated conveyor 26, and when the bridge and elevating conveyor are in the lowered position shown in FIG. 5, a gap 82 is minimized.

As shown in FIG. 5, the bridge 28 has a king post 98 extending upwardly from a structural base 100, to an upper end 103, and has connecting members 102 connected to the upper end of the king post 98 which form a truss between the upper end 56 of the bridge and the lower end 104 of the bridge.

Although the bridge 28 is stabilized in the upper and lower positions by a force e.g., 30 lbs, a spring loaded brake 106 is shown in FIG. 9 mounted to lock the pivot shaft 32 to the upper platform 24. The brake, for example a disk brake, is engaged by the spring to lock the bridge 28 against movement unless power is available and applied to an electromechanical actuator (not shown) to overpower the spring and release the brake 106.

It should be understood that the bridge 28 while shown as having king posts 98 and connecting members 102 forming trusses between the upper end 56 of the bridge and the lower end 104 of the bridge, this configuration may be replaced with any suitable structural arrangement which provides the necessary strength and stiffness and structural efficiency to the bridge 28.

It should also be understood that the support leg 46 may also be pivotally mounted to the lower end 39 of the elevating conveyor 34, so that the leg may be retracted by a linear actuator such as a motor driven linear actuator similar to but smaller than the actuator 66 which raises and lowers the bridge 28.

It should also be understood that the vertical position of the counterweight 44 can be raised by additional nuts 74 positioned above the flanges 72 to support the counterweight in a more elevated position as another variable in positioning the counterweight to control how the total cg 62 moves as the bridge 28 and the elevating conveyor 34 are tilted. The counterweight 44, as shown in FIG. 9, is arranged to provide an even biasing force to hold the bridge in the upper or lower position with about 30 pounds of force, as will be understood by a person of ordinary skill in the art. This force could be increased by adding more weights e.g. more individual weights 68, and by adjusting the height of the total counterweight height above a plane passing through the pivot 32.

It should also be understood that the bridge 28 and more particularly the elevating conveyor and more particularly the elevating conveyor 34 is normally tilted a maximum of 22° when used with segmented belt convertor sections due to the limited drive force of the motors when moving a 70 lb pound load, and is limited to about 26° even with a one continuous belt conveyor. Practical installations consideration may limit the minimum tilt angle to 5° of 10° or 15° due to space consideration.

It is understood that the invention is not limited to the particular construction and arrangement of parts herein illustrated and described, but embraces all such modified forms thereof as come within the scope of the following claims.

I claim:

1. A pivoting elevating conveyor apparatus, positioned to transfer items from a lower loading floor, the apparatus comprising:
   an upper platform spaced from the loading floor which is at a level of pedestrian traffic on the loading floor;
   an elevated conveyor mounted to the upper platform;
   a bridge, pivotally mounted about a pivot to the upper platform, wherein a vertical plane passes through an axis of the pivot;
   a stop mounted to the upper platform for engagement with the bridge;
   an elevating conveyor mounted to and supported on the bridge and arranged to pivot with the bridge, the elevating conveyor having an upper end arranged to discharge articles on to the elevated conveyor, and a lower end;
   a support leg mounted in an extended position to the lower end of the elevating conveyor, the support leg arranged to support the elevating conveyor on the loading floor;
   wherein the bridge and the elevating conveyor mounted thereto are pivotable on the pivot an angle of up to about 26° between a substantially horizontal storage position with the bridge engaged with the stop, and a position engaged with the loading floor;
   wherein the bridge has a first portion on a first side of the pivot which extends beyond the pivot to a counterweight bracket on which a counterweight is supported, and a second portion which supports the elevating conveyor on a second side of the pivot opposite the counterweight;
   wherein the first portion of the bridge, the counterweight, and the counterweight bracket have a first mass and a first center of gravity, and wherein the elevating conveyor, the support leg and the second portion of the bridge have a second mass, and a second center of gravity, and the first mass and the second mass together define a total mass which pivots, and the total mass which pivots has a total center of gravity;
   wherein in the substantially horizontal storage position the total center of gravity is spaced away from the vertical plane defined by the pivot toward the first part of the bridge and applies a force of a first selected value to hold the bridge and the elevating conveyor mounted thereto to the stop mounted to the upper platform; and
   wherein the counterweight bracket supports the counterweight so that when the bridge rotates away from the horizontal to lower the elevating conveyer and support leg to engage the loading floor, the first center of gravity moves more toward the vertical plane than the second center of gravity moves toward the vertical plane, so that the total center of gravity is located spaced from the vertical plane toward the second part and applies a force of a second selected value to hold the second part of the bridge and the elevating conveyor mounted thereto in engagement with the loading floor with the force of the second selected value.

2. The apparatus of claim 1 wherein the pivot is a pivot shaft and wherein the elevating conveyor has a structure which supports a belt or series of conveyor rolls defining a conveying surface, and wherein the structure has portions defining a cutaway closely spaced from the pivot shaft so that the cutaway accommodates the pivot shaft and so that the conveying surface extends above the pivot shaft in the substantially horizontal storage position.

3. The conveyor of claim 1 wherein the pivot is a pivot shaft and wherein the elevated conveyor has a structure which supports a belt or series of conveyor rolls defining a conveying surface, and wherein the structure has portions defining a cutaway closely spaced from the pivot shaft so that the cutaway accommodates the pivot shaft and so that the conveying surface extends above the pivot shaft.

4. The conveyor of claim 1 further comprising a lock arranged to lock the conveyor in the substantially horizontal storage position.

5. The conveyor of claim 1 wherein the pivot is a pivot shaft, and further comprising:
   a disk brake mounted to the pivot shaft and having a spring which locks the brake into engagement with the upper platform to prevent the pivoting of the conveyor; and
   an actuator arranged to retract the spring and disengage the brake from the upper platform when the actuator is powered.

6. The conveyor of claim 1 wherein the force of the first selected value and the force of the second selected value are in a range between about 20 lbs and about 80 lbs.

7. The conveyor of claim 1 further comprising a linear actuator mounted between the bridge and the upper platform which causes the bridge to pivot about an angle of up to about 26°.

8. A conveyor system comprising:
   a loading floor;

an upper platform spaced from the loading floor such that a person can walk or stand beneath the upper platform;
an elevated conveyor mounted to the upper platform;
a stop mounted to the upper platform;
a pivoting structure mounted about a pivot to the upper platform wherein a vertical plane is defined which passes through an axis of the pivot, and the pivoting structure defines a center of gravity of the pivoting structure, wherein the pivoting structure comprises:
   a bridge engageable with the stop and pivotally mounted about the pivot to the upper platform;
   an elevating conveyor mounted to and supported on the bridge, and arranged to pivot with the bridge, the elevating conveyor having an upper end arranged to discharge articles on to the elevated conveyor, and a lower end arranged to support the elevating conveyor on the loading floor;
wherein the pivoting structure is pivotable on the pivot an angle of up to about 26° between a storage position with the bridge engaged with the stop, and a position engaged with the loading floor;
wherein the pivoting structure center of gravity is arranged above the pivot so that when the pivoting structure is in the storage position, the pivoting structure center of gravity is spaced in a horizontal direction from the vertical plane in a first direction away from the elevating conveyor so that the pivoting structure is biased to engage the stop mounted to the upper platform; and
wherein the center of gravity is arranged so that when the pivoting structure is rotated up to about 26° to engage the loading floor, the center of gravity is spaced in the horizontal direction from the vertical plane in a second direction opposite the first direction so that the pivoting structure is biased to engage the loading floor.

9. The conveyor of claim 8 wherein the pivot is a pivot shaft and wherein the elevating conveyor section has a structure which supports a belt or series of conveyor rolls defining a conveying surface, and wherein the structure has portions defining a cutaway closely spaced from the pivot shaft so that the cutaway accommodates the pivot shaft and so that the conveying surface extends above the pivot shaft at least in the storage position.

10. The conveyor of claim 8 wherein the pivot is a pivot shaft and wherein the elevated conveyor has a structure which supports a belt or series of conveyor rolls defining a conveying surface, and wherein the structure has portions defining a cutaway closely spaced from the pivot shaft so that the cutaway accommodates the pivot shaft and so that the conveying surface extends above the pivot shaft.

11. The conveyor of claim 8 further comprising a lock arranged to lock the conveyor in the storage position.

12. The conveyor of claim 8 wherein when the pivoting structure is rotated up to about 26° degrees to engage the loading floor the pivoting structure is biased to engage the loading floor with a force of about 30 lbs, and when the pivoting structure is in the storage position, the pivoting structure is biased to engage the stop mounted to the upper platform with a force of about 30 lbs.

13. The conveyor of claim 8 further comprising a support leg mounted in an extended position to the lower end of the elevating conveyor, the support leg arranged to support the elevating conveyor on the loading floor.

14. A pivoting elevating conveyor apparatus comprising:
a loading floor;
an upper platform spaced from the loading floor such that a person can walk or stand beneath the upper platform;
an elevated conveyor mounted to the upper platform;
a bridge pivotally mounted about a pivot to the upper platform, wherein a vertical plane is defined which passes through an axis of the pivot;
an elevating conveyor mounted to and supported on the bridge and arranged to pivot with the bridge, the elevating conveyor having an upper end arranged to discharge articles on to the elevated conveyor, and the elevating conveyor has a lower end arranged to support the elevating conveyor on the loading floor;
wherein the bridge and the elevating conveyor are pivotable on the pivot an angle of up to about 26° between a raised storage position in which the bridge engages an upper stop, and a lowered position in which the elevating conveyor is positioned for loading from the loading floor, the loading floor forming a lower stop;
wherein the bridge and elevating conveyor have mass properties such that the bridge is biased toward the upper stop when moved to the storage position, and the elevating conveyor is biased toward the lower stop when moved to the lowered position, the mass properties being such that a center of gravity of the bridge and elevating conveyor moves from one side of the pivot to an opposite side of the pivot as the bridge and elevating conveyor are pivoted about the angle of up to about 26°;
wherein in the storage position the center of gravity applies a force of a selected value to hold the bridge to the upper stop; and
wherein when the bridge rotates away from the horizontal, the center of gravity moves so that the center of gravity applies a force of a selected value to hold the elevating conveyor to the lower stop.

15. The conveyor of claim 14 wherein the elevating conveyor further comprises a support leg arranged to support the elevating conveyor on the loading floor when the bridge is rotated so the elevating conveyor engages the work floor.

16. The conveyor of claim 14 wherein the pivot is a pivot shaft and wherein the elevating conveyor has a structure which supports a belt or series of conveyor rolls defining a conveying surface, and wherein the structure has portions defining a cutaway closely spaced from the pivot shaft so that the cutaway accommodates the pivot shaft and so that the conveying surface extends above the pivot shaft in the horizontal storage position.

17. The conveyor of claim 14 wherein the pivot is a pivot shaft and wherein the elevated conveyor has a structure which supports a belt or series of conveyor rolls defining a conveying surface, and wherein the structure has portions defining a cutaway closely spaced from the pivot shaft so that the cutaway accommodates the pivot shaft and so that the conveying surface extends above the pivot shaft.

18. The conveyor of claim 14 further comprising a lock arranged to lock the conveyor in the storage position.

19. The conveyor of claim 14 wherein when the bridge is rotated up to about 26° so the elevating conveyor engages the lower stop the elevating conveyor is biased to engage the loading floor with a force of about 30 lbs, and when the bridge is in the storage position the bridge is biased to engage the upper stop mounted to the upper platform with a force of about 30 lbs.

20. The conveyor of claim 14 further comprising a liner actuator mounted between the bridge and the upper platform to cause the bridge to pivot about the angle of up to about 26°.

* * * * *